United States Patent
Leuthner et al.

(10) Patent No.: US 8,920,951 B2
(45) Date of Patent: Dec. 30, 2014

(54) DEVICE AND METHOD FOR COOLING A BATTERY MODULE

(75) Inventors: Stephan Leuthner, Leonberg (DE); Philipp Kohlrausch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 839 days.

(21) Appl. No.: 12/919,872

(22) PCT Filed: Jan. 23, 2009

(86) PCT No.: PCT/EP2009/050757
§ 371 (c)(1),
(2), (4) Date: Nov. 5, 2010

(87) PCT Pub. No.: WO2009/106393
PCT Pub. Date: Sep. 3, 2009

(65) Prior Publication Data
US 2011/0045326 A1    Feb. 24, 2011

(30) Foreign Application Priority Data
Feb. 27, 2008  (DE) .......................... 10 2008 011 466

(51) Int. Cl.
| | |
|---|---|
| H01M 10/50 | (2006.01) |
| F28D 15/00 | (2006.01) |
| H01M 10/613 | (2014.01) |
| H01M 10/6564 | (2014.01) |
| H01M 2/10 | (2006.01) |
| H01M 10/052 | (2010.01) |
| H01M 10/625 | (2014.01) |
| H01M 10/663 | (2014.01) |

(52) U.S. Cl.
CPC ...... *H01M 10/5004* (2013.01); *H01M 10/5069* (2013.01); *H01M 2/1016* (2013.01); *H01M 10/052* (2013.01); *H01M 10/5016* (2013.01); *H01M 10/5095* (2013.01)
USPC ........................................ 429/72; 165/104.11

(58) Field of Classification Search
None
See application file for complete search history.

(56) References Cited

U.S. PATENT DOCUMENTS

| | | | |
|---|---|---|---|
| 5,490,572 A | 2/1996 | Tajiri et al. | |
| 6,422,027 B1 * | 7/2002 | Coates et al. | ................ 62/259.2 |

(Continued)

FOREIGN PATENT DOCUMENTS

| | | |
|---|---|---|
| DE | 102005017057 A1 | 10/2006 |
| EP | 1577973 A1 | 9/2005 |

(Continued)

OTHER PUBLICATIONS http://www.gwradiators.com/radiator-accessories.html.*

*Primary Examiner* — Patrick Ryan
*Assistant Examiner* — Christopher Domone
(74) *Attorney, Agent, or Firm* — Maginot, Moore & Beck LLP

(57) ABSTRACT

In a battery module, having a housing, at least one battery, which is disposed in the housing, at least one inlet opening for introducing a cooling fluid into the housing, and at least one outlet opening for conducting the cooling fluid out of the housing. According to the invention, compressed cooling fluid can be supplied to the at least one inlet opening using a compressor. A reduction of the cooling performance because of heating of the compressed cooling fluid is to be at least partially avoided. Furthermore, the design effort is to be low and the battery module is to be cost-effective to produce. The invention solves a problem in that the cooling fluid can be cooled by a cooling apparatus.

21 Claims, 2 Drawing Sheets

(56) References Cited

U.S. PATENT DOCUMENTS

2003/0080714 A1    5/2003  Inoue et al.
2005/0202310 A1*   9/2005  Yahnker et al. ................ 429/62
2007/0009787 A1*   1/2007  Straubel et al. ................ 429/99
2007/0026303 A1*   2/2007  Jeon et al. .................... 429/143

FOREIGN PATENT DOCUMENTS

| JP | 5344606 A    |   | 12/1993 |
| JP | H05-344606   | * | 12/1993 |
| JP | 2001105843 A |   | 4/2001  |
| JP | 2007-276696 A |  | 10/2007 |

* cited by examiner

DEVICE AND METHOD FOR COOLING A BATTERY MODULE

CROSS-REFERENCE TO RELATED APPLICATION

This application is a 35 USC 371 application of PCT/EP2009/050757 filed on Jan. 23, 2009.

BACKGROUND OF THE INVENTION

1. Field of the Invention

The invention relates to a battery module, including a housing, at least one battery disposed in the housing, at least one inlet opening for introducing a cooling fluid into the housing, and at least one outlet opening for carrying the cooling fluid out of the housing, in which a cooling fluid compressed by means of a compressor is deliverable to the at least one inlet opening. The further relates to a battery module system and to a method for cooling at least one battery disposed in a housing.

2. Description of the Prior Art

Batteries, such as lithium-ion batteries, supply electric current to various kinds of equipment, such as hybrid motor vehicles, electrically operated vehicles such as wheelchairs, bicycles with auxiliary electric drives, forklifts, or power tools. In general, a plurality of batteries are installed in one housing, thus forming a battery module. Battery modules have the advantage that they are more easily cooled with a cooling fluid, and higher electrical capacities can easily be attained by combining a plurality of battery modules into a battery module system.

The normally cylindrical batteries disposed in a housing are cooled with circulated air as the cooling fluid. The cooling concepts here contemplate either a purely longitudinal or axial flow, or a purely transverse or radial flow toward the cylindrical batteries in the housing. In the process, the air flows through openings or bores in the housing and back out again. To improve the cooling of the batteries, especially with tightly packed batteries in the housing of the battery module, compressed air is used for the cooling, since compressed air has a higher mass per unit of volume, and thus the cooling capacity is increased. In tightly packed batteries, it is in general possible only with compressed air for the heat output by the batteries to be adequately dissipated.

From German Patent Disclosure DE 10 2005 017 057 A1, a battery cooling device for battery units disposed in a housing is known. A pump compresses air and feeds it through a pressure conduit to the battery units, in order to cool the battery units in the housing. However, the air is heated by the compression, so that the cooling capacity is adversely reduced.

OBJECT AND SUMMARY OF THE INVENTION

The object of the present invention is therefore to make a battery module, a battery module system, and a method for cooling at least one battery disposed in a housing available that at least partly avert a decrease in the cooling capacity from the heating of the compressed cooling fluid. Moreover, the engineering expense should be low, and the battery module should be inexpensive to produce.

DISCLOSURE OF THE INVENTION

This object is attained with a battery module, including a housing, at least one battery disposed in the housing, at least one inlet opening for introducing a cooling fluid into the housing, and at least one outlet opening for carrying the cooling fluid out of the housing, in which a cooling fluid compressed by means of a compressor is deliverable to the at least one inlet opening, and the cooling fluid is coolable by a cooling device.

Cooling fluid lines and housings output heat to the environment, as long as the temperature of the cooling fluid line and the housing is higher than the temperature of the environment. The term "cooling devices" is understood to mean devices, such as special coatings on the surface of the cooling fluid line, which increase the heat dissipation, or cooling fins, which increase the surface area for heat dissipation, that increase the cooling capacity of the cooling fluid line and/or of the housing beyond the amount present anyway. The cooling fluid can also be cooled before being compressed. If the cooling fluid is air, for instance, then by means of a refrigerating system the air can be cooled to below the temperature of the ambient air and only after that compressed in the compressor.

In a further feature, the cooling fluid compressed by the compressor is coolable.

Expediently, the cooling fluid is coolable by the cooling device before the introduction of the cooling fluid into the housing.

In an additional embodiment, the cooling fluid is coolable by means of the cooling device in a cooling fluid line leading from the compressor to the at least one inlet opening.

In a supplementary feature, the cooling device is at least one cooling fin.

In particular, the at least one cooling fin is disposed on the cooling fluid line.

In an additional embodiment, by means of a blower, ambient air can be conducted to the at least one cooling fin and/or to the cooling fluid line, in order to cool the cooling fluid in the cooling fluid line. By means of the active conduction of ambient air, the cooling capacity of the cooling fluid line and/or the at least one cooling fin can be increased.

Preferably, the cooling device is a refrigerating system. In particular, this is a compression refrigerating system of an air conditioning system of a motor vehicle, which is used partly to cool the cooling fluid.

In a further embodiment, a heat exchanger, in particular an evaporator, of the refrigerating system is disposed on or in the cooling fluid line that leads in particular from the compressor to the at least one inlet opening. The heat exchanger can also be disposed on and/or in the cooling fluid line leading to the compressor.

Expediently, the battery module includes a relief device for expanding the cooling fluid conducted out of the at least one outlet opening.

In an additional feature, by means of a heat exchanger, the cooling fluid compressed by the compressor can be cooled by the cooling fluid emerging from the relief device.

Expediently, the heat exchanger is disposed on and/or in the cooling fluid line leading from the compressor to the at least one inlet opening.

In a further feature, a regulating unit, which controls and/or regulates the pressure in the housing and/or the temperature of the at least one battery, is associated with the battery module.

In particular, the at least one battery is a lithium-ion battery, and/or the cooling fluid is a gas, in particular air.

A battery module system of the invention includes at least one battery module as described above.

A method of the invention for cooling at least one battery, disposed in a housing, includes the steps of compressing a cooling fluid, introducing the compressed cooling fluid into the housing, cooling the at least one battery with the compressed cooling fluid, conducting the compressed cooling fluid out of the housing, and relieving the pressure of the cooling fluid, in which the cooling fluid is cooled.

In particular, the compressed cooling fluid is cooled. The cooling of the compressed cooling fluid has the advantage that the compressed cooling fluid has a higher temperature than the uncompressed cooling fluid, so that the requisite technological expense and/or the energy requirement is lower.

In a further feature, the cooling fluid, preferably compressed, is cooled such that the cooling capacity is increased additionally by means of a cooling device from the cooling effect already present in cooling fluid lines and/or housings. Cooling fluid lines and/or housings output heat to the environment, for instance by thermal radiation or convection. This "normal" cooling effect is not sufficient, so that by means of a cooling device, the cooling of the cooling fluid is increased markedly.

In an additional feature, the cooling fluid is cooled before being introduced into the housing.

In a supplementary embodiment, the cooling fluid is conducted in a cooling fluid line from a compressor to the housing and is cooled in the in the cooling fluid line.

Preferably, the cooling fluid is cooled by cooling fins and/or by a refrigerating system, such as a compression or adsorption refrigerating system.

In a further feature, by means of a regulating unit, the pressure in the housing and/or the temperature of the at least one battery is controlled and/or regulated.

In an additional embodiment, the regulating unit controls and/or regulates the pressure in the housing and/or the temperature of the at least one battery as a function of the internal pressure in the at least one battery and/or of the temperature of the cooling fluid aspirated by the compressor and/or of the temperature of the compressed cooling fluid introduced into the housing and/or of the temperature of the cooling fluid conducted out of the housing and/or of the temperature of the cooling fluid after the expansion in the relief device.

The invention further includes a computer program with a program code, which are stored in memory on a computer-readable data medium, in order to perform a method as described above, when the computer program is performed on a computer or a corresponding arithmetic unit.

The invention further includes a computer program product with a program code, which are stored in memory on a computer-readable data medium, in order to perform a method as described above, when the computer program is performed on a computer or a corresponding arithmetic unit.

BRIEF DESCRIPTION OF THE DRAWINGS

Three exemplary embodiments of the invention will be described in further detail below, in conjunction with the appended drawings, in which.

DESCRIPTION OF THE PREFERRED EMBODIMENTS

Figure 1:
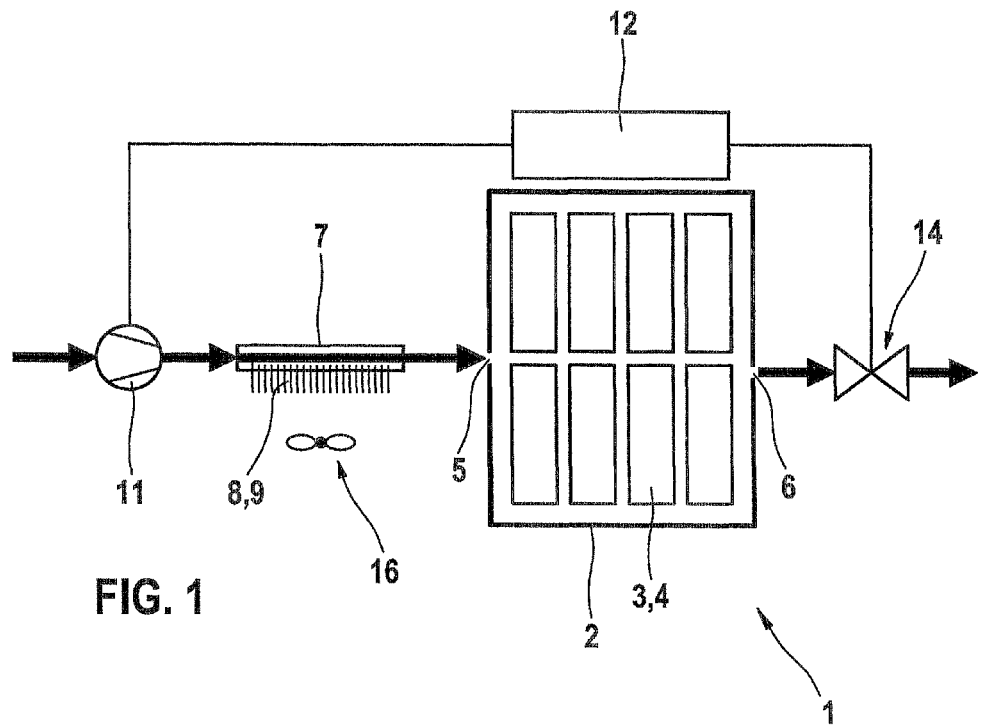
FIG. 1 is a schematic longitudinal section through a battery module in a first exemplary embodiment, with cooling fins for cooling the compressed air.

In FIG. 1, a battery module 1 according to the invention, with a housing 2 for receiving eight batteries 3, embodied as lithium-ion batteries 4, is shown in a highly schematic cross section. The battery module 1 is preferably used in motor vehicles, especially hybrid motor vehicles (not shown). As the cooling fluid, air is used, which is aspirated and compressed by a compressor 11, then conducted through a cooling fluid line 7, and introduced through an inlet opening 5 into the housing 2 having the batteries 3. The compressed air absorbs heat from the batteries 3 disposed in the housing 2 and is then conducted through an outlet opening 6 out of the housing 2 to a relief device 14. In the relief device 14, the compressed air is pressure-relieved back to normal air pressure in the range of 1000 mbar. The pressure generated by the compressor 11, such as a blower or compressor, is in the range for instance of from 100 to 3000 mbar above normal air pressure.

A regulating unit 12 controls and/or regulates the pressure in the housing 2. By means of sensors, not shown, the regulating unit 12 receives data on the internal pressure in the batteries 3 and the housing 2, the temperature in the at least one battery 3, the temperature of the ambient air, the temperature of the compressed air introduced into the housing 2, the temperature of the air conducted out of the housing 2, and the temperature of the air after the expansion in the relief device 14. The requisite cooling capacity is ascertained by the regulating unit 12 from the data measured by the sensors; for that purpose, corresponding functions and/or databases, for instance, are stored in memory in the regulating unit 12. The pressure is set as a function of the internal pressure in the batteries 3 and/or the requisite cooling capacity and/or the temperature of the ambient air. The setting of the pressure in the housing 2 as a function of the internal pressure in the batteries 3 serves to avoid deformation of the batteries 3 and resultant leaks. Advantageously, the pressure in the housing 2 is greater than the internal pressure in the batteries 3. As a result, the energy expenditure necessary for compressing the air can be minimized or optimized.

Cooling fins 9 are mounted on the cooling fluid line 7 that conducts the air from the compressor 11 into the housing 2. The cooling fins 9 serve as a cooling device 8 and cool the compressed air, conducted through the cooling fluid line 7, by dissipating the heat to the environment. With a blower 16, ambient air can also be conducted actively to the cooling fins 9 or the cooling fluid line 7, in order to further increase the cooling capacity of the cooling fins 9. The blower 16 can also be connected to the regulating unit 12, so that the regulating unit 12 controls and/or regulates the blower as a function of the requisite cooling capacity, to minimize the energy expenditure necessary for the blower 16.

Figure 2:
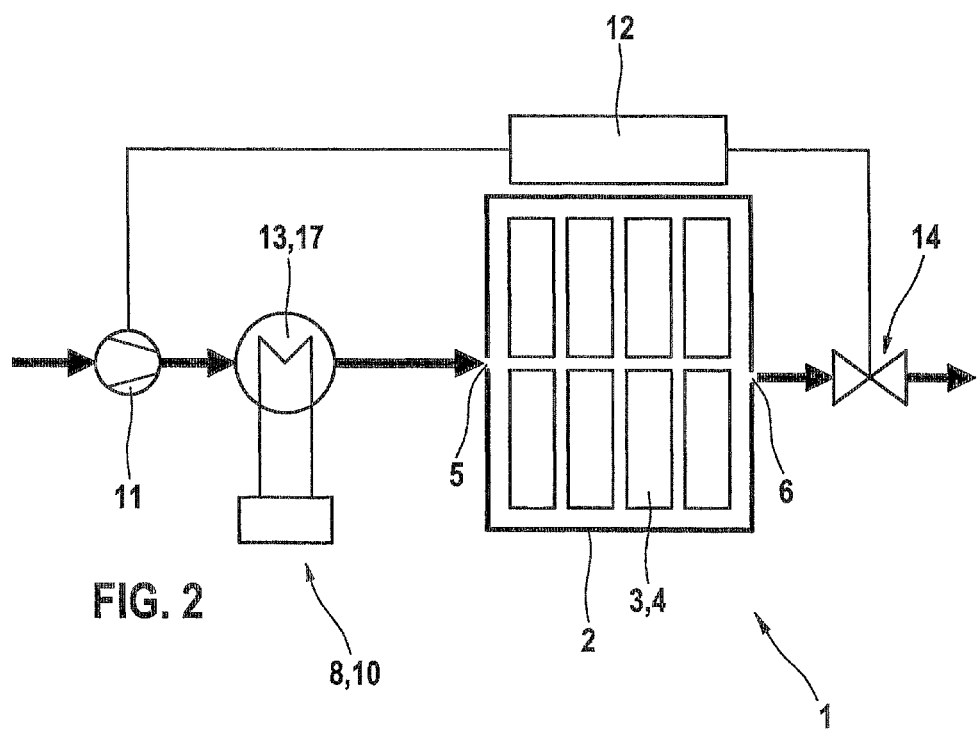
FIG. 2 is a schematic longitudinal section through a battery module in a second exemplary embodiment, with a refrigerating system for cooling the compressed air.
Figure 3:
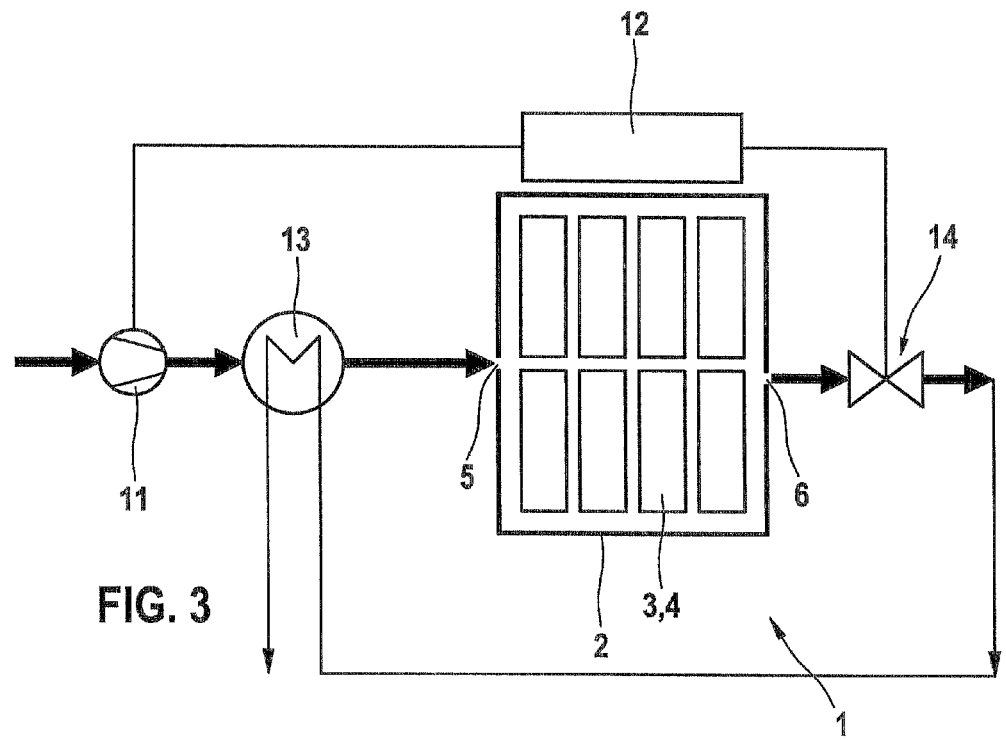
FIG. 3 is a schematic longitudinal section through a battery module in a third exemplary embodiment, with a heat exchanger for cooling the compressed air by means of the pressure-relieved cooling air.

In FIGS. 2 and 3, a second and third exemplary embodiment of the battery module 1 are described. Below, only the differences in the second and third exemplary embodiment from the first exemplary embodiment will be described.

In the second exemplary embodiment shown in FIG. 2, by means of a refrigerating system 10, in particular a compression refrigerating system of an air conditioning system of a motor vehicle, as a cooling device 8, the air compressed by the compressor 11 is cooled before it is introduced into the housing 2. To that end, the evaporator 17 of the compression refrigerating system is mounted (not shown) on the cooling fluid line 7; that is, it is a heat exchanger 13, which outputs the heat from the air to the refrigerant of the refrigerating system 10. The refrigerating system 10 is preferably connected (not shown) to the regulating unit 12, so that the regulating unit 12 controls and/or regulates the refrigerating system 10 as a function of the requisite cooling capacity, in order to minimize the energy expenditure necessary for the refrigerating system 10. This can be done in that by means of a valve, only the requisite portion of the refrigerant, conducted in a refrigerant line, is conducted (not shown) to the evaporator 17 on the cooling fluid line 7.

The third exemplary embodiment shown in FIG. 3, for cooling the compressed air in the cooling fluid line 7, employs the air that is pressure-relieved and thus cooled downstream of the relief device 14. To that end, the pressure-relieved air is conducted to a heat exchanger 13 disposed on the cooling fluid line 7 and can thus cool the compressed air conducted through the cooling fluid line 7. In the cooling fluid line 7, not shown, for conducting the pressure-relieved air to the heat exchanger 13, there is a valve, not shown, for controlling and/or regulating the quantity of pressure-relieved air conducted to the heat exchanger 13. The valve is connected to the regulating unit 12, so that the regulating unit 12 controls and/or regulates the valve as a function of the requisite cooling capacity. The prerequisite of the cooling device 8 shown in the third exemplary embodiment is that the temperature of the pressure-relieved cooling fluid is less than the temperature of the compressed cooling fluid before it is introduced into the housing 2. By means of suitable temperature sensors (not shown), these two temperatures are measured, and the valve is opened by the regulating unit 12 only if there is a sufficient temperature difference.

Figure 4:
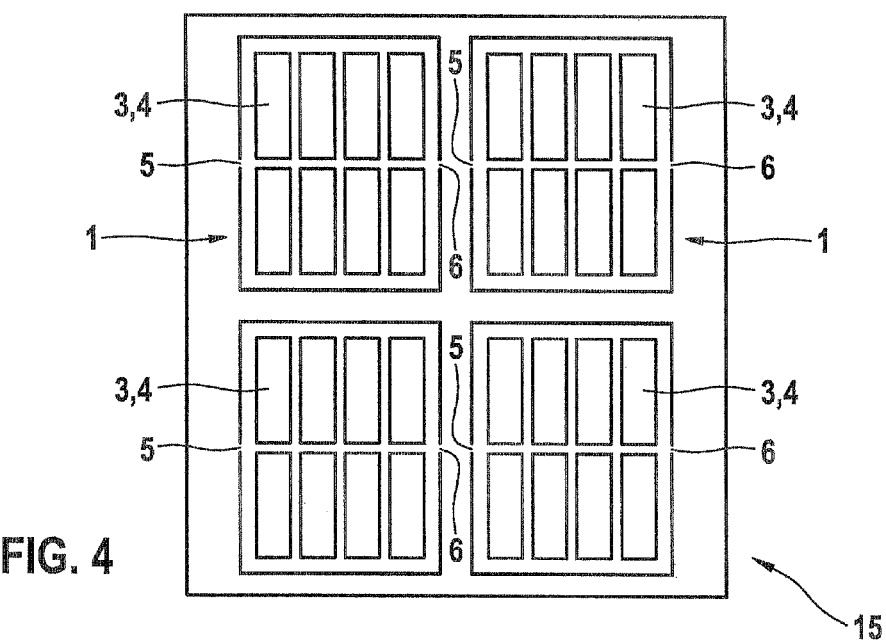
FIG. 4 is a schematic longitudinal section through a battery module system.

A plurality of battery modules 1 can also be joined to make a battery module system 15 according to the invention (FIG. 4). The inlet and outlet openings 5, 6 of the individual battery modules 1 are connected parallel (not shown) to a central compressor 11. In a battery module system 15, for instance for a passenger car or utility vehicle, with four battery modules 1 (not shown), each with eight lithium-ion batteries 4, there are accordingly thirty-two lithium-ion batteries 4. The modular construction thus permits better scalability, since with the identical battery modules 1, various electrical capacities for various applications can easily be achieved.

The details of the various exemplary embodiments can be combined with one another as long as nothing to the contrary is mentioned.

Overall, with the battery module 1 of the invention, the cooling capacity is improved substantially. In battery modules 1 for motor vehicles, it is often necessary to dispose the batteries 3 quite compactly at close spacing from one another, so that the highest possible electrical capacity can be achieved for a requisite unit of volume of the battery module 1. When lithium-ion batteries 4 are used, the temperature of the lithium-ion batteries 4 should not be higher than 60° C., and the temperature difference between the lithium-ion batteries 4 should amount to less than 4K. For cooling these tightly packed batteries 3, it is generally necessary to compress the air for the cooling, so that the heat can be adequately dissipated. Upon compression, however, the air employed as cooling fluid heats up, so that the compressed air used for the cooling has a higher temperature and can thus produce only a slight cooling capacity. The cooling of the compressed air prevents this adverse effect, so that by simple means, the cooling capacity can be improved substantially, and thus the service life of the batteries 3 can be lengthened.

The foregoing relates to the preferred exemplary embodiments of the invention, it being understood that other variants and embodiments thereof are possible within the spirit and scope of the invention, the latter being defined by the appended claims.

The invention claimed is:

1. A battery module, including:
   a housing;
   at least one battery disposed in the housing;
   at least one inlet opening for introducing a compressed cooling fluid into the housing, the compressed cooling fluid being compressed by a compressor; and
   at least one outlet opening for carrying the compressed cooling fluid out of the housing,
   wherein the housing is configured to conduct the compressed cooling fluid from the at least one inlet opening to the at least one outlet opening past the at least one battery, and
   wherein the at least one battery is exposed to and contacted by the compressed cooling fluid such that the compressed cooling fluid absorbs heat from the at least one battery as the compressed cooling fluid is conducted from the at least one inlet to the at least one outlet, and
   wherein the battery module includes a relief device fluidly connected to the at least one outlet opening and configured to expand the cooling fluid discharged from the at least one outlet opening so as to reduce a pressure of the discharged cooling fluid.

2. The battery module as defined by claim 1, wherein the compressed cooling fluid is coolable.

3. The battery module as defined by claim 2, wherein the cooling fluid is coolable by a cooling device before the cooling fluid is introduced into the housing.

4. The battery module as defined by claim 3, wherein the cooling fluid is coolable by the cooling device in a cooling fluid line leading from the compressor to the at least one inlet opening.

5. The battery module as defined by claim 4, wherein the cooling device is at least one cooling fin.

6. The battery module as defined by claim 5, wherein the at least one cooling fin is disposed on the cooling fluid line.

7. The battery module as defined by claim 4, further having a blower with which ambient air can be conducted to the at least one cooling fin and/or to the cooling fluid line, in order to cool the cooling fluid in the cooling fluid line.

8. The battery module as defined by claim 1, wherein the cooling device is a refrigerating system.

9. The battery module as defined by claim 8, wherein the refrigerating system includes a heat exchanger disposed on or in the cooling fluid line that leads from the compressor to the at least one inlet opening.

10. The battery module as defined by claim 1, further having a heat exchanger that is fluidly coupled to receive cooling fluid from the relief device and configured to use the cooling fluid from the relief device to cool the cooling fluid from the compressor prior to the compressed cooling fluid being introduced into the housing via the at least one inlet.

11. The battery module as defined by claim 10, wherein the heat exchanger is disposed on and/or in a cooling fluid line leading from the compressor to the at least one inlet opening.

12. The battery module as defined by claim 1, wherein a regulating unit, which controls and/or regulates pressure in the housing and/or a temperature of the at least one battery, is associated with the battery module.

13. The battery module as defined by claim 1, wherein the at least one battery is a lithium-ion battery, and/or the cooling fluid is a gas.

14. A battery module system having a plurality of battery modules, characterized in that the battery module system includes at least one battery module as defined by claim 1.

15. A method for cooling at least one battery, disposed in a housing, having the steps of:
compressing a cooling fluid with a compressor;
introducing the compressed cooling fluid into the housing via at least one housing inlet;
conducting the compressed cooling fluid from the at least one housing inlet to at least one housing outlet;
exposing the at least one battery to the compressed cooling fluid and contacting the at least one battery with the compressed cooling fluid as the compressed cooling fluid is being conducted from the at least one housing inlet to the at least one housing outlet such that the at least one battery is cooled with the compressed cooling fluid;
conducting the compressed cooling fluid out of the housing via the at least one housing outlet to a pressure relief device which is fluidly connected to the at least one housing outlet; and
reducing the pressure of the cooling fluid conducted out of the housing using the pressure relief device, wherein the cooling fluid is cooled.

16. The method as defined by claim 15, further comprising:
communicating the compressed cooling fluid from the compressor to a cooling device;
cooling the compressed cooling fluid at the cooling device; and
communicating the cooled, compressed cooling fluid from the cooling device to the at least one inlet of the housing.

17. The method as defined by claim 16, wherein the cooling fluid is cooled such that a cooling capacity of the cooling fluid is increased additionally beyond a cooling effect already present in cooling fluid lines and/or housings.

18. The method as defined by claim 16, wherein the cooling fluid is conducted in a cooling fluid line from the compressor to the at least one inlet of the housing and is cooled in the cooling fluid line by the cooling device.

19. The method as defined by claim 18, wherein the cooling fluid is cooled by cooling fins and/or by a refrigerating system.

20. The method as defined by claim 15, wherein by means of a regulating unit, pressure in the housing and/or a temperature of the at least one battery is controlled and/or regulated.

21. The method as defined by claim 20, wherein the regulating unit controls and/or regulates the pressure in the housing and/or the temperature of the at least one battery as a function of an internal pressure in the at least one battery and/or of a temperature of the cooling fluid aspirated by the compressor and/or of a temperature of the compressed cooling fluid introduced into the housing and/or of a temperature of the cooling fluid conducted out of the housing and/or of a temperature of the cooling fluid after an expansion in the relief device.

* * * * *